340-870.13 SR

XR 4,053,714

United State[s Patent] [19]

Long

[11] 4,053,714

[45] Oct. 11, 1977

[54] ELECTRICAL DATA COLLECTING DEVICE

[75] Inventor: Robert G. Long, Toronto, Canada

[73] Assignee: Canadian PGL Electronics Inc., Scarborough, Canada

[21] Appl. No.: 674,130

[22] Filed: Apr. 6, 1976

[51] Int. Cl.$^2$ .................................................. H04J 3/08

[52] U.S. Cl. ................................ 179/15 AL; 340/183; 340/203

[58] Field of Search ......... 179/2 AM, 15 AL, 15 BD, 179/15 BI; 340/151, 147 LP, 150, 182, 183, 203

[56] References Cited

U.S. PATENT DOCUMENTS

| | | | |
|---|---|---|---|
| 2,406,165 | 8/1946 | Schroeder | 179/15 AL |
| 2,520,185 | 8/1950 | Van Mierlo | 179/15 AL |
| 2,723,309 | 11/1955 | Lair | 179/15 AL |
| 3,603,932 | 9/1971 | Kerr | 179/15 AL |
| 3,786,423 | 1/1974 | Martell | 340/151 |

*Primary Examiner*—David L. Stewart
*Attorney, Agent, or Firm*—Woodard, Weikart, Hardt & Naughton

[57] ABSTRACT

This invention relates to data transmission system of the type where a plurality of transmitters are located at a location remote from a receiver and are adapted to transmit information from their location in turn to the receiver. The transmitters in the case of this invention are each self-powered and have their own transmitter timer associated with them. They are all set to operate from time zero by a master timer and their individual power sources are recharged for the power dissipated in each of their transmissions by a charging pulse that is received over the transmission line. The resetting of the transmitter timers to cause them to transmit in sequence is done during the recharging period which follows the transmissions of the series of transmitters.

6 Claims, 6 Drawing Figures

ELECTRICAL DATA COLLECTING DEVICE

This invention relates to digital data transmitters of the time division multiplex type which are configured onto a single pair of wires.

Data transmitters of this general type are commonly used to collect data from widespread locations on a single data telephone line. They could, for example, be used in the measurement and collection of data related to petrochemical products stored in tanks on tank farms. The transmitters could transmit information on the level of product in a tank, the temperature of product in a tank and the pressure in a tank. In such a use, transmitters with sensors would be mounted at each tank and the output of the sensors is fed to the transmitters for transmission over a single dataline to a remote receiving station where it is decoded and read out.

In the usual installation of this type, there is a plurality of data transmitters each of which has a receiver associated therewith that receives a signal over the dataline from a central transmitting station to dictate the transmission period of the individual transmitters whereby the plurality of transmitters transmit over the data line to the remote receiver each after the other as polled by the central transmitting station. The provision of a receiver for each transmitter to control its transmission period is costly and cumbersome.

It has been found that the costly and cumbersome practice of providing a receiver to control the transmission sequence of the transmitters over the dataline can be avoided by the use of a simple timing device adjacent to the transmitters that is set from a central location to cause the transmitters to transmit, in turn, each after the other, in a pre-determined sequence.

An electrical data transmitting system according to this invention has a plurality of transmitters each having a rechargeable power source, each having at least one sensor with its output connected to the input of its respective transmitter, and each having a transmitter timer; a data transmission line; a receiver to receive signals transmitted over said data transmission line; a master timer; a rechargeable voltage source connectable to said transmission line to simultaneously recharge the rechargeable power source of each of said transmitters; said transmitters being normally not connected to the transmission line for transmission; means for simultaneously setting the transmitter timer of each of said transmitters to connect its respective transmitter to the data transmission line whereby the plurality of transmitters are connected one at a time and in predetermined time sequence to the data transmission line for transmission; said transmitters when connected for transmission to said transmission line each being adapted to transmit information about their location and the output of their respective sensors to said receiver; said master timer being cyclically operable to dictate connection of said recharging voltage source to said transmission line for a predetermined time to recharge the rechargeable power source as aforesaid, in the time interval following sequential data transmission by said plurality of said transmitters as aforesaid; said means for simultaneously setting said transmitter timers being responsive to operation of said master timer during said time interval following data transmission to set the transmitter timer of each of said transmitters as aforesaid. The invention will be clearly understood after reference to the following detailed specification read in conjunction with the drawings.

Figure 1:
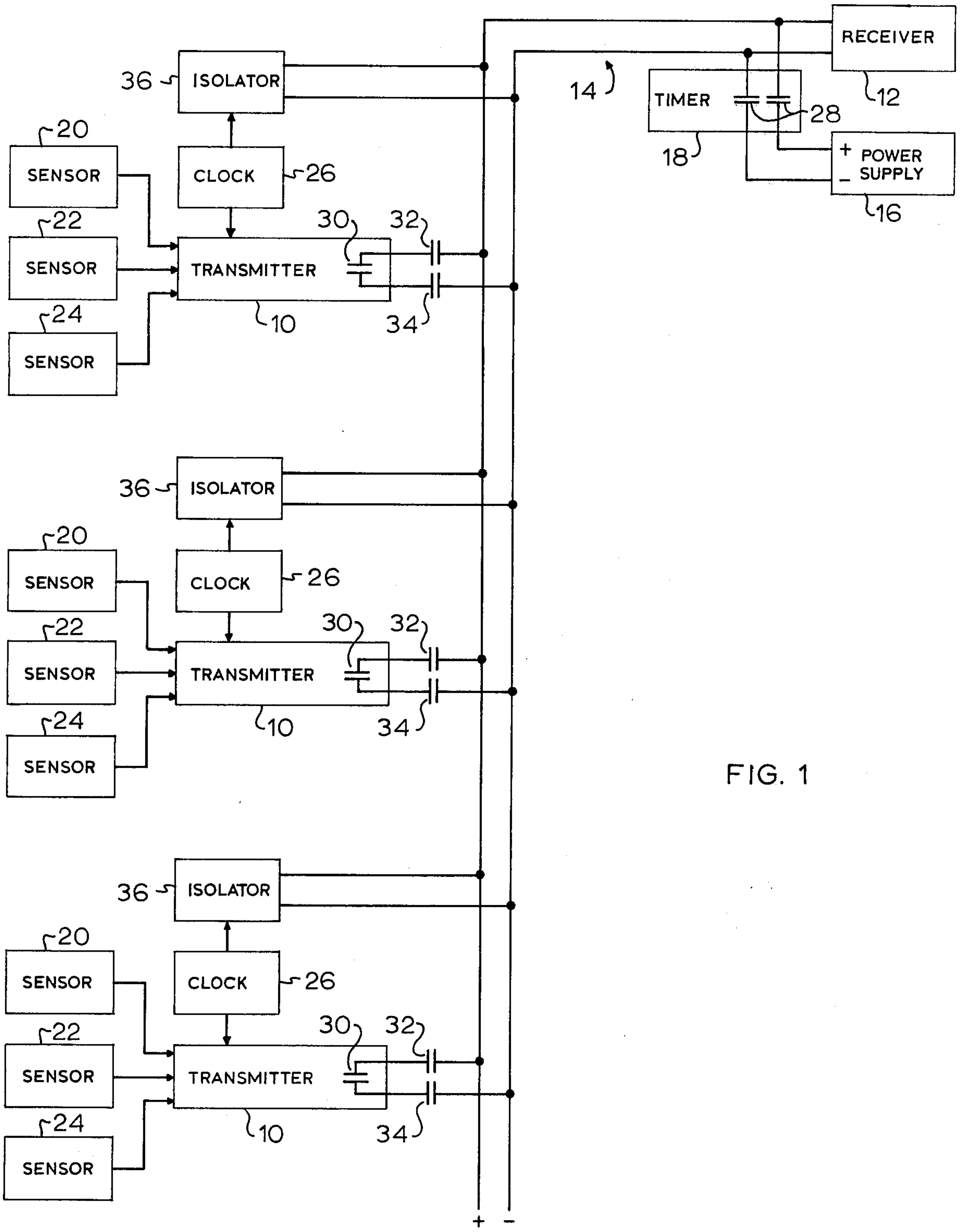
FIG. 1 is a lock diagram illustration of a data transmitting system showing three transmitters.

FIG. 1 is a schematic illustration of a data transmitting system showing three transmitters 10 and a receiver 12 for the transmitters on a transmission line, generally indicated by the numeral 14. Each of the transmitters has its own rechargeable battery source of power which, in use, is recharged over the transmission line 14 with power from the power supply 16 as dictated by the operation of a master timer 18 as will be explained later.

Each transmitter is further connected to three sensing devices 20, 22 and 24. These devices have electrical outputs that can be transmitted by the transmitter over the transmission line.

Each transmitter further has its own quartz crystal controlled timer clock 26. These timer clocks are settable to connect their respective transmitter to the data transmission line for transmission in a predetermined time sequence wherein each of the transmitters is connected to the line in turn, one at a time, to transmit the output of its respective sensing devices to the receiver.

After each of the transmitters has been connected to the transmission line by its respective timer to transmit the output of its respective sensing devices, a master time 18 operates circuit breaker 28 to connect voltage source 16 to the transmission line and to the rechargeable battery power sources of the transmitters for a short period of time to permit a charging pulse of current to flow to the rechargeable nicad battery power sources of the transmitters and recharge them for the power used in the transmission.

The recharging pulse also acts to reset the timer clocks 26 of the transmitters to control the next following transmission of data from the transmitters to the receiver 12.

The transmitters 10 transmit their message with an output that consists of bipolar pulses. They are square wave generated but, in practice, round off into a general saw-toothed configuration in the process of transmission. Pulses having a generated amplitude of about 7 volts have been found satisfactory. The width of the pulse at the base is equal to the width of the space between pulses. Pulses have one polarity for binary "1" and the other polarity for binary "0".

As indicated, the transmitters 10 are connected to the data transmission line 14 for transmission one at a time and in time sequence by the quartz crystal timer clocks 26 and after each transmitter has transmitted its data once, it ceases to transmit, disconnects its driver from the communication line and transmits nothing further until its clock is reset by the recharging pulse. There is a cyclic transmission of data from the transmitters 10, each transmitting in serial arrangement.

The transmission of each transmitter consists of forty digital pulses or bits designated as a word. As indicated, each of the transmitters transmits in turn and the words of the three transmitters constitute a sentence. In the Example of this invention described herein, the transmitters 10 transmit a 40 bit word which has the following composition;

| | |
|---|---|
| First eight bits | transmitter address |
| Next eight bits | input to transmitter from sensor 20 |
| Next eight bits | input to transmitter from sensor 22 |
| Next sixteen bits | input to transmitter from sensor 24 |

A quiet period of eight bits length precedes data transmission from each transmitter and a quiet period of 16 bits follows data transmission from each transmitter. Thus, each transmitter requires sufficient time for 64 bits to transmit its forty bit word. The timing of the quiet periods and the connection of the transmitters to the transmission line for transmission is controlled by the timer of the individual transmitters. Thus, the timer clock 26 of the first transmitter operates to provide a quiet period of eight bits during which the transmitter output driver is connected to the communication line and establishes a low impedence clamp so as to ensure minimum noise pick-up immediately prior to the transmission of data. Following the quiet period, it connects its transmitter to the transmission line to transmit its address, the output of sensor 20, the output of sensor 22 and the output of sensor 24. Following the completion of the transmission and the provision of the sixteen bit quiet period, it disconnects its transmitter from the transmission line. Then, the timer of the second transmitter controls its transmitter through a similar sequence following which the timer of the third transmitter controls its transmitter through a similar sequence and when the third and last transmitter has transmitted, the master timer 18 operates to connect the voltage source 16 to the transmission line to recharge the battery power sources of each of the transmitters. The recharging cycle is for a predetermined time in the nature of a few seconds depending upon the design of the units and their requirement for recharging.

As indicated upon recharging the timers are reset to cause their respective transmitters to transmit in turn following termination of the recharging cycle and disconnection of the recharging source from the transmission line.

It has been found quite practical to recharge the battery power sources for between 50 and 100 transmitters over a standard transmission line.

The peak pulse battery charging current that must be carried by the transmission line is a function of the bit rate and the number of transmitters on the line and it has been calculated that, for a data transmission speed of 8,000 bits per second and 250 micro power logic transmitters 10 on the line, will result in a peak pulse battery charging current of about 1.5 amperes over a recharging interval of about one second. This current can be handled by reasonable transmission wire sizes. These circumstances of bit rate and transmitter numbers are, however, extreme and most common installations will involve a bit rate in the order of 500 bits per second and less than 50 transmitters. Thus, most practical situations are well below the extreme situation that has been found to be within the limits dictated by reasonable transmission wire sizes.

The transmitters 10 are standard three state transmitters and the numerals 30, 32 and 34 refer to the breaker contacts. Numeral 36 refers to an isolator that will pass only the higher 24 volt recharging current pulse from the voltage 16 to the batteries of the transmitters. Crystal clocks 26 which control the operation of their respective transmitters 10 are reset during the time interval between sentences by passage of current rhrough the isolators 36.

Figure 2:
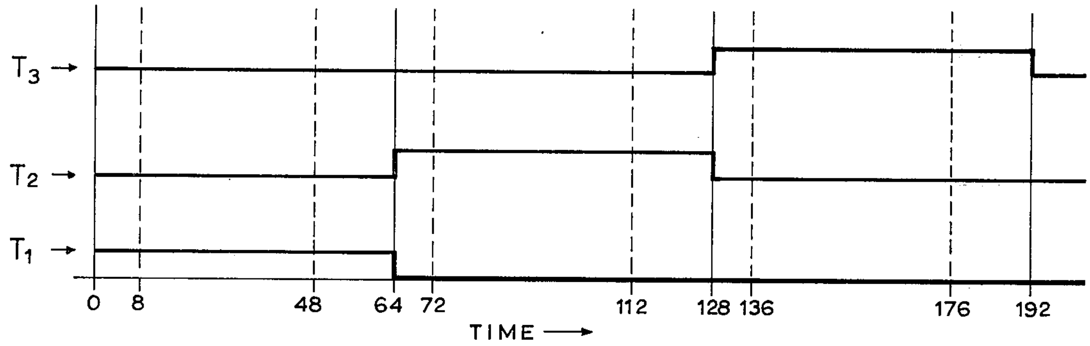
FIG. 2 is a graph illustrating the sequential transmission of the three transmitters.

FIG. 2 is a time base graph illustrating the connection of the transmitters 10 to the line 14 under control of their respective clocks 26. Time has been indicated in digital indications of the transmitter outputs, i.e., bits. In this illustration, a line indicating the connection of each transmitter to the line during the transmission of a sentence has been indicated. The open condition of the transmitter in each case is indicated by the lower line and under this condition, each of the breakers 30, 32 and 34 is open and its respective transmitter is disconnected from the line. The upper line indicates the other two conditions of the three state transmitter.

All transmitters are, as indicated, controlled by their respective timer clocks 26 which are simultaneously reset by the transmission of a recharging pulse from the charging source 16. At the termination of the recharging pulse the first transmitter indicated by TI on the graph has its contacts 30, 32 and 34 closed. This condition exists for a period of eight bits and provides a quiet period that precedes actual data transmission. Following a time lapse of eight bits, breaker 30 is opened and breakers 32 and 34 remain closed under the control of the crystal clock 26. In this condition, the digital output of the transmitter is connected to the transmission line. The transmitter is operational and transmits its output to the receiver 12.

The transmitter so connected to the line remains in this condition for 40 bits, i.e., to bit 48 on the time scale of the graph. During this period, it transmits a word of the transmitted sentence.

At the time of bit 48, the quartz clock of transmitter 1 again operates to close breaker 30 and all breakers are again in the closed condition and the transmitter is shorted on the line. It remains in this condition for 16 bits, to bit 64 on the time graph. At bit 64, the clock of transmitter 1 operates to open each breakers 30, 32 and 34 to entirely disconnect the transmitter TI from the line. Transmitter TI remains in this condition during the transmission periods of the other transmitters T2 and T3.

While transmitter 1 was either shorted across the line or operational on the line during the first 64 bits of the time scale, transmitters T2 and T3 were in the open circuit condition with each of their breakers in the open condition as indicated by their respective graphs. At the time of bit 64, the time clock of transmitter T2 operates to conduct it through a similar shorted and operational condition to that of transmitter TI during the first 64 bits. At the time of bit 128, transmitter T2 ceases to transmit and each of its breakers are opened to disconnect it from the line.

As transmitter 2 is disconnected from the line; the driver of transmitter 3 is connected to the line by closure of its breakers 32 and 34 and it does through a similar 64 bit operation similar to transmitters Ti and T2 and specifically described for transmitter TI.

At the termination of transmission of transmitter T3 all transmitters are disconnected from the communication line and await instruction.

This instruction takes the form of the applied recharging voltage from voltage source 16 which is of a greater magnitude than the transmitter output signals. In practice, a voltage of 24 volts has been used for recharging at a transmitting voltage of 7.

A practical recharging pulse using a bit rate of 500 bits per second will be of a duration of about 1500 bits. Following this, the transmitters TI, T2 and T3 transmit again as just described, under the dictation of their respective quartz crystal clocks which are each reset by the transmission of the recharging pulse over the line to cause the transmitters to transmit as just explained.

The sequence is repeated on a continuous basis.

The word of each transmitter in the Example given consists of the transmitter address and the inputs to the transmitter of each of the transmitter sensors. The timer for each transmitter controls the connection of the sensors for transmission to compose the transmitter word.

In a practical situation, there will, in most cases, be many more than three transmitters. The invention has been used to determine the pressure temperature and level of oil in storage tanks on a tank farm in which case a transmitter 10 is located on each oil storage tank and the system continuously measures these quantities in each of the tanks on the farm. The receiver is located at a remote location and is provided with a computer to give a continuous readout for each of the storage tanks on the farm.

Figure 3:
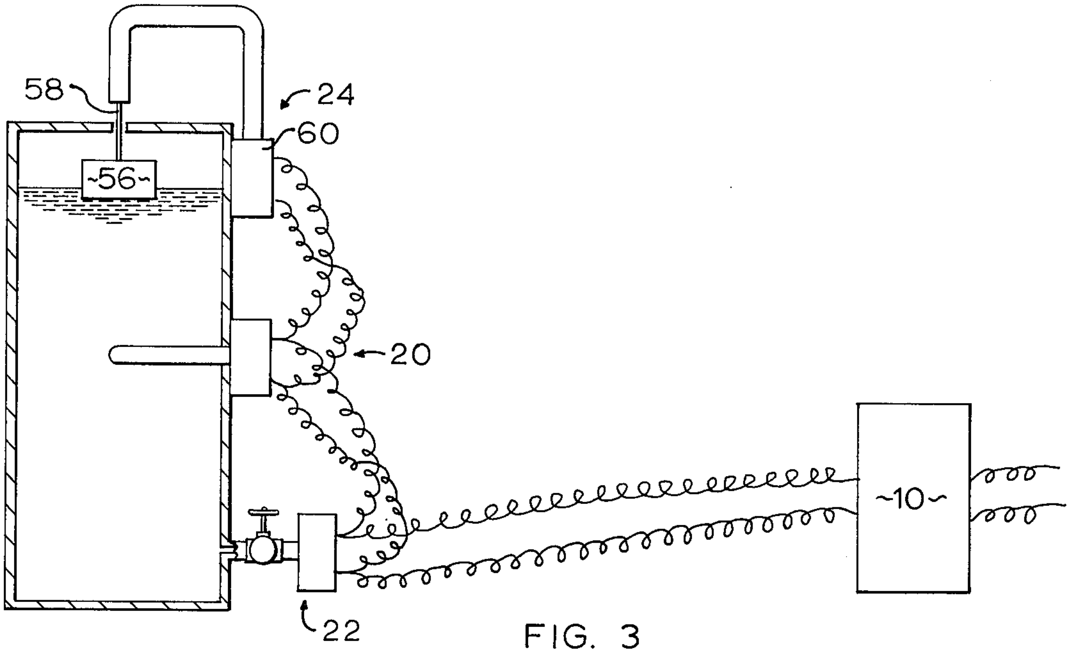
FIG. 3 is a schematic illustration of three sensors of a transmitter.
Figure 4:
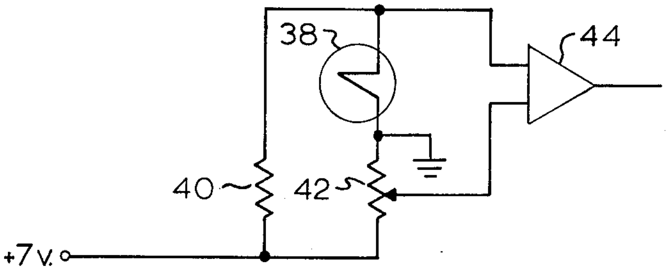
FIG. 4 is a schematic illustration of the temperature sensor.

FIG. 3 is a schematic illustration of the sensors used in an oil storage tank and the data transmitter 10 for an individual oil storage tank. In FIG. 3, sensor 20 which senses the temperature of the oil within the tank has been generally indicated by the numeral 20. It consists essentially of a resistance temperature device in a bridge circuit with an amplifier the output of which is fed to an analogue to digital converter of the transmitter to give a digital output that is transmitted over the transmission line during the appropriate eight bits of the 40 bit word for the transmitter concerned. FIG. 4 is a wiring illustration of the device.

The resistance temperature device 38 is immersed in the liquid oil within the storage tank and is electrically connected in a bridge circuit that includes constant current resistor 40 and potentiometer 42. The variable contact of the potentiometer 42 is used to calibrate the sensor. Voltage for the circuit is supplied from the transistor battery source and the output of the circuit which varies with the temperature of the oil in the tank is supplied to the operational amplifier 44. Power for amplifier 44 is also taken from the transmitter battery power supply.

The output from the amplifier 44 is applied to an input of the transmitter 10. In this respect, the output from the amplifier 44 is analogue and the transmitter includes an analogue to digital converter the output of which is fed to a storage device that stores the record of temperature as detected by the resistance temperature device 38 for transmission.

This information of the sensor 20 is transmitted during the second 8 bits of the 40 bit word for its respective transmitter.

With this invention and the self-powered transmitter with its quartz clock controlled operation, current is circulated through the bridge circuit which contains the temperature sensing transducer only when an actual measurement is being taken. This is controlled by the clock for the particular transmitter to which the sensing device relates. It is a very short period of time and results in substantial advantages in use.

Resistance temperature devices are subject to error due to internal heating from their own power supply. Because of this, they are normally used at very low output levels. With the selfpowered transmitter technique of this invention, current is circulated through the measuring element for very short periods of time only. Because of this, the average power dissipated in the measuring interval can be relatively high without being subject to internal heating. The achievement of this relatively high power results in a high signal output which is much easier to handle and less susceptible to noise than a low level signal output.

In a device already constructed, the resistance temperature device 38 was powered during the first eight bits of the transmission cycle when the transmitter transmits its address to the receiver. The result was stored and transmitted to the receiver during the second eight bits of the transmission period. Thus, through operation of the timer, the period during which the resistance temperature device is powered was substantially reduced and resulted in a high signal output and greater accuracy.

Figure 5:
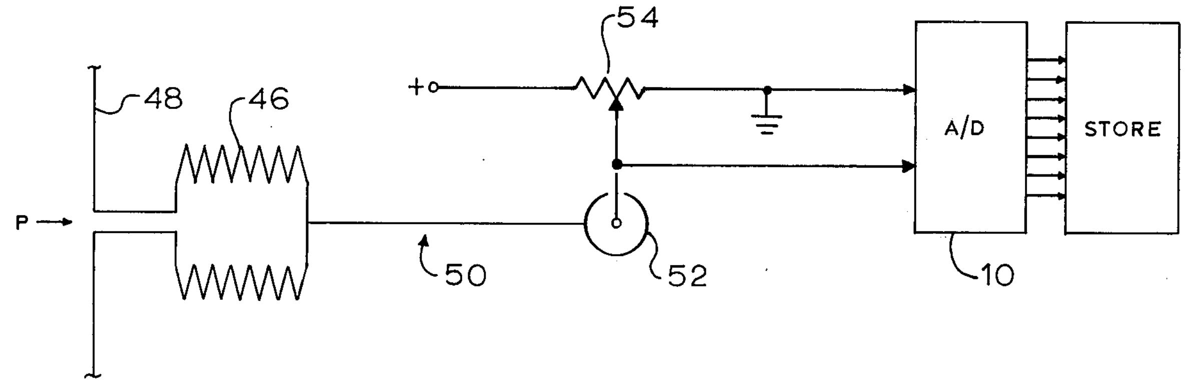
FIG. 5 is a schematic illustration of the pressure sensor.

The pressure is determined by sensor 22. FIG. 5 is a schematic illustration of the operation of the pressure sensing device. It consists of a bellows 46, one side of which is exposed to the interior of the tank 48 and the other side of which is on the outside of the tank 48. The side of the bellows on the outside of the tank assumes a position that is responsive to variations of pressure within the tank and there is a linkage 50 from the outer side of the tank that has a dial 52 that assumes a position related to the pressure. Dial 52 acts on a poteniometer 54, the output of which is fed to an input of the transmitter 10. The input has an analogue to digital converter which converts the analogue electrical output from the potentiometer 54 to a digital output and stores it for transmission. The output of the pressure sensing device is transmitted during the third eight bit piece of the 40 minute word of each transmitter. Potentiometer 54 is powered from the battery source of the transmitter but only during transmission period.

Pressure sensing devices and potentiometers are well known in the art and further detail is not thought necessary.

Level within the tank is determined by sensor 24. This is achieved by float 56 connected by means of a tape to a take-up rell that is spring loaded and located in the housing of the device 60. The shaft from the reel adopts a position related to the level of the float. Shaft encoders are well known in the art and further detail of the mechanical features of a shaft encoder are not thought necessary. The mechanical output of the shaft of the shaft encoder is applied to an electrical circuit that produces a digital output and which is transmitted during the last sixteen bit interval of each forty bit word of each transmitter. Power for the circuit is obtained from the power source of the transmitter.

The arrangement of the bits in a transmitted word is capable of great variation and does not form an essential part of the invention. However, as indicated, in the 40 bit word transmitted from each of the teansmitters 10 with this invention, the first eight bits transmit the location or address of the transmitter and identify the link. The second eight bits transmits the output of the temperature sensing device. The third eight bits transmit the instant output of the pressure sensing device and the last sixteen bits transmits the instant output of the level sensing device.

Figure 6:
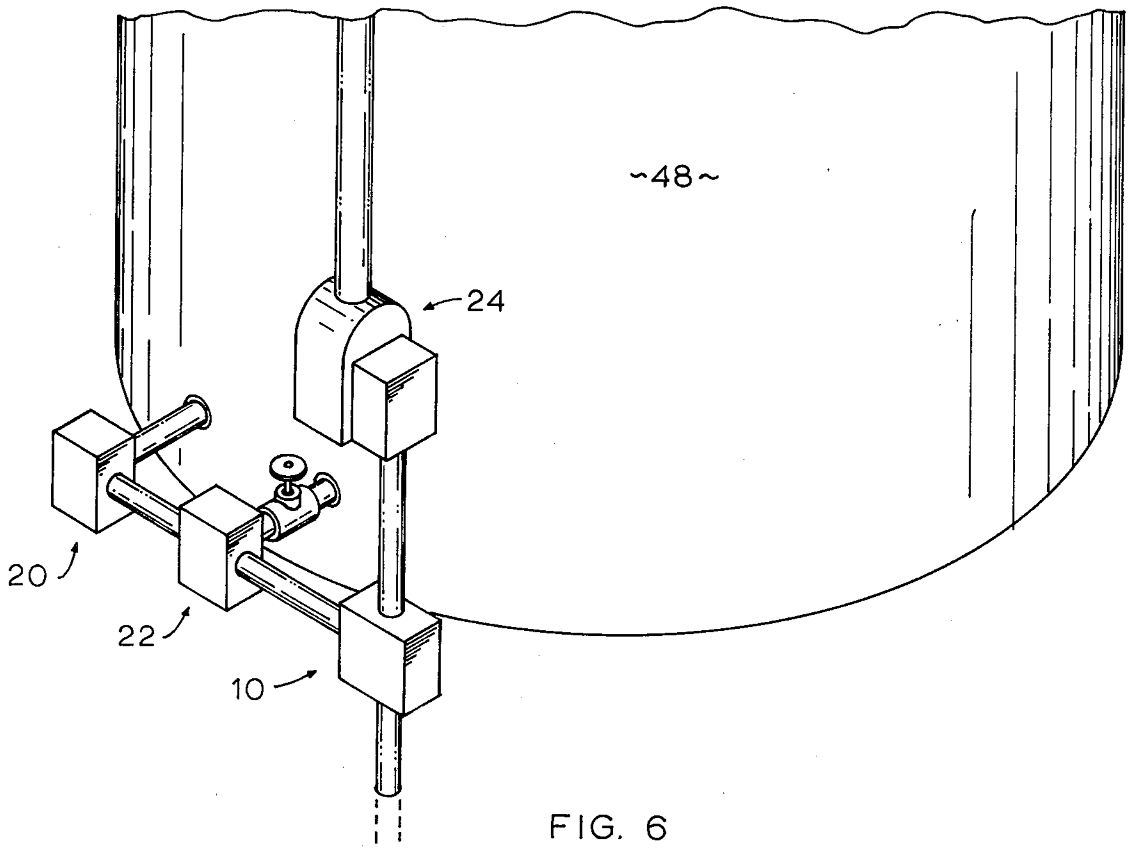
FIG. 6 is an illustration of a transmitter mounted on the side of a storage tank.

FIG. 6 is a view of the lower portion of an oil storage tank showing an installation according to this invention. Numeral 24 refers to the shaft encoder which detects level. Numeral 22 refers to the pressure sensing device and numeral 20 refers to the temperature sensing device. They are all connected to the transmitter 10 which, as indicated, is housed within an explosion proof housing. The compactness of the installation is apparent from FIG. 6.

In the system, all clocks are reset to real time zero by the reset pulse originating from the charging source and clock drift is only significant on a "per scan" basis.

The invention has been effectively used on an oil tank farm having about 14 oil storage tanks each fitted with a transmitter like the transmitter 10 with sensors for level, pressure and temperature as described and adapted to send a word having the composition described to a receiver at a remote central location. The bit rate for transmission was 500 bits per second. All transistors had crystal clocks of standard design and there was no difficulty in achieving a 0.01% stability. The words were transmitted at 24 bit intervals, as described above. The charging pulse was 24 volts and had a duration of about 4 seconds.

All clocks were set to real time zero by the reset pulse originating from the receiver location so that clock drift was only significant on a per scan basis.

The pulses had a generated amplitude of about 7 volts, as described above. The signals received by the receiver were decoded and fed through a computer of standard design to give a readout of pressure, temperature and level.

Each transmitter took a time period of 64 bits to transmit including the quiet periods at the beginning and end of its 40 bit word. Thus, the 14 transmitters took 896 bits to complete a sentence. The elapsed time for the 896 bits was less than 2 seconds. A recharging period of 4 seconds was used and the total elapsed time for transmission of all transmitters and recharging was rounded off at 6 seconds. The master timer was, therefore, set to connect and disconnect the recharging source at intervals of 6 seconds.

The Examples and quantities given are by way of example only and not to be construed in a restrictive way. The embodiments of the invention other than the ones illustrated will be apparent to those skilled in the art.

What I claim as my invention is:

1. An electrical data transmitting system for collection and transmission of data from a plurality of remote locations comprising:

a plurality of data transmitting devices each having an input, an output and a rechargeable power source;

a plurality of remotely-located data sensors electrically connected to the inputs of said data transmitting devices, said sensors being constructed to sense data at their respective locations and conduct a corresponding signal to the input of said data transmitting device;

a plurality of transmitting device timers, each of which is electrically connected to a respective one of said data transmitting devices;

a data receiving device having an input and being constructed to receive at said input data signals from the outputs of said data transmitting devices;

a data transmission line for electrically connecting the input of said data receiving device and the outputs of said data transmitting devices;

a recharging voltage source for recharging each of said rechargeable power sources through said data transmission line;

means for setting the transmitting device timer of each of said data transmitting devices to connect for a time interval one of said data transmitting devices to said data transmission line whereby the plurality of data transmitting devices are connected to and disconnected from said data transmission line, one at a time, in a predetermined time sequence; and a master timer electrically connected to said data transmission line and constructed to be cyclically operable to dictate connection of said recharging voltage source to said data transmission line to recharge said rechargeable power sources for a time interval following sequential data transmission by said plurality of data transmitting devices, said means for setting the transmitting device timers being responsive to operation of said master timer.

2. The electrical data transmitting system of claim 1 in which each of said data transmitting devices has more than one sensor.

3. The electrical data transmitting system of claim 1 in which said data sensor of said transmitter is electrically powered from the rechargeable power source of its data transmitting device.

4. The electrical data transmitting system of claim 1 in which said data sensor of said data transmitting device, is electrically powered from the rechargeable power source of its data transmitting device, said data sensor being intermittently powered under control of the transmitting device timer of its respective data transmitting device to provide a signal for transmission of its respective data transmitting device.

5. The electrical data transmitting system of claim 1 in which said data sensor of said data transmitting device is electrically powered from the rechargeable power source of its data transmitting device, each of said data transmitting devices having more than one data sensor.

6. The electrical data transmitting system of claim 1 in which said data sensor of said data transmitting device is electrically powered from the rechargeable power source of its data transmitting device, each of said data transmitting devices having more than one data sensor, said data sensors being intermittently powered under control of the transmitting device timer of their respective data transmitting device to provide a signal for transmission of its respective data transmitting device.

* * * * *